(12) United States Patent
Lawrence

(10) Patent No.: US 10,591,109 B2
(45) Date of Patent: Mar. 17, 2020

(54) SURVEY SUPPORT APPARATUS

(71) Applicant: Stanley Lawrence, Seattle, WA (US)

(72) Inventor: Stanley Lawrence, Seattle, WA (US)

( * ) Notice: Subject to any disclaimer, the term of this patent is extended or adjusted under 35 U.S.C. 154(b) by 78 days.

(21) Appl. No.: 15/919,173

(22) Filed: Mar. 12, 2018

(65) Prior Publication Data

US 2018/0259120 A1    Sep. 13, 2018

Related U.S. Application Data

(60) Provisional application No. 62/469,678, filed on Mar. 10, 2017.

(51) Int. Cl.
*F16M 13/02* (2006.01)
*F16M 11/32* (2006.01)
*G01C 15/00* (2006.01)

(52) U.S. Cl.
CPC ............ *F16M 13/02* (2013.01); *F16M 11/32* (2013.01); *F16M 13/022* (2013.01); *G01C 15/00* (2013.01); *F16M 2200/024* (2013.01); *F16M 2200/028* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,400,516 A * | 3/1995 | Kellenberger | ......... | G01C 15/00 248/169 |
| 5,769,370 A * | 6/1998 | Ashjaee | ................ | F16M 11/14 248/168 |
| 6,206,139 B1 * | 3/2001 | Bogart, Jr. | ................ | E06C 1/22 182/166 |
| 6,631,877 B1 * | 10/2003 | Crain | ..................... | G01C 15/00 248/168 |
| 6,772,526 B1 * | 8/2004 | Crain | ..................... | G01C 15/00 33/293 |
| 7,207,534 B2 * | 4/2007 | Crain | .................... | F16B 7/1463 248/188 |
| 7,222,827 B2 * | 5/2007 | Crain | .................... | F16B 7/1463 248/170 |
| 8,047,498 B1 * | 11/2011 | Karty | .................... | F16M 11/36 248/156 |
| 9,382,721 B2 * | 7/2016 | Morta | ................... | E04H 1/1205 |

(Continued)

*Primary Examiner* — Monica E Millner
(74) *Attorney, Agent, or Firm* — Christopher Mayle; John D. Houvener; Bold IP, PLLC

(57) ABSTRACT

Embodiments herein are directed to a surveying support apparatus, which provides greater reliability when calculating measurements. The surveying support apparatus includes a center column having a hollow circumference to fit over a piece of rebar protruding from the concrete, a plurality of bolt through fasteners in apertures along the path of the center column that are tightened to come into contact with the rebar thus securing the rebar in a fixed place in relation to the center column, pivotal legs that are extendable to find support upon the ground, a head component connected to the pivotal legs that can move in a transitional movement along the center column, a mounting plate connected to the center column having an aperture whereby a mounting screw is placed, survey equipment having a recess that is secured to the mounting plate by rotating the mounting screw into the recess of the survey equipment.

18 Claims, 5 Drawing Sheets

(56) References Cited

U.S. PATENT DOCUMENTS

| | | | | |
|---|---|---|---|---|
| 2001/0045554 A1* | 11/2001 | Pulliam | ............... | A01K 3/00 |
| | | | | 256/65.14 |
| 2004/0163336 A1* | 8/2004 | Hsu | ............... | E04H 12/2223 |
| | | | | 52/157 |
| 2014/0197573 A1* | 7/2014 | Goss | ............... | B29C 39/10 |
| | | | | 264/279.1 |

* cited by examiner

SURVEY SUPPORT APPARATUS

CROSS REFERENCE TO RELATED APPLICATION

This application claims priority to a prior-filed provisional application Ser. No. 62/469,678 filed on Mar. 10, 2017.

FIELD OF DISCLOSURE

The field of disclosure generally relates to survey instruments. More particularly, the invention is directed to a surveying support apparatus suitable for support of theodolites, transits, total stations, or other devices used in optical or electronic surveys.

BACKGROUND

Surveying is an important activity used in building plans, zoning, property sales, and other various activities. Surveying can be used to determine boundaries as well as measuring angles in the horizontal and vertical planes while operating at construction sites. Engineers depend on surveying equipment for analyzing the stability for these structures. It is crucial for the integrity of a building or other structure that these measurements used in design planning or blueprints is accurate. The need for accuracy requires the surveying equipment to act in a predictable and precise manner. Because surveying requires precision, surveyors demand an apparatus that can hold measuring tools such as theodolites, 3D scanners, total stations, levels or transits, steady during measurement calculations. Even the slightest movement of the measuring tools can lead to vibration or other anomalies that greatly impact the readings and can result in various inaccuracies.

To achieve greater accuracy during surveying multi-legged stands or tripods are used to provide a foundation for the measuring tools. Tripods are typically portable and offer support and stability along both the side-to-side and up-and-down axis of motion. With adjustable legs, tripods are also suitable for outdoor landscapes or other areas with uneven ground. In order to achieve the instrument specified accuracy it is vital that the correct tripod is used. The construction and weight of the tripod have a major influence on providing a stable platform for the instrument. It is important that the tripods are capable of holding the weight of the measuring tools without collapsing or warping when holding excessive weight for long periods of time. The tripod also needs to be stable when subjected to various rotational forces from moving the measuring tools and tripod head plates around the tripod. Currently available tripods do no fully eliminate vibration or adequately secure the support platform in a rigid, fixed state or on the other hand require specialized preparation and present intrusive installation issues.

SUMMARY

It is an object of the present invention to provide a surveying support apparatus having: a column having a hollow cylindrical portion, a longitudinal axis, and a series of apertures along a path of the column, a head component having a center, an aperture therein through the central portion which the column projects, legs connected to the head component, a series of bolt fasteners positioned in the series of apertures, whereby the series of bolt fasteners are tightened to come in contact with rebar lap protruding from concrete positioned inside of the hollow cylindrical portion of the column, securing the rebar lap in a fixed position with respect to the column, a mounting stand, having a mounting plate and a bracket, the bracket having an aperture therein through the central portion which the column projects, the bracket adapted for rotational motion around the path of the column, the mounting plate further having an aperture through the mounting plate whereby a mounting screw is positioned, and a surveying equipment device having a recess whereby surveying equipment device is securable to the mounting plate by the fastening of the mounting screw into the recess, the survey equipment device being a Robotic Total Stations (RTS), 3D scanner, or theodolite.

It is an object of the present invention to provide a method of stabilizing a surveying support apparatus, the method having the steps of: positioning the surveying support apparatus over rebar lap protruding from concrete, the surveying support apparatus including a column having a hollow cylindrical portion, a longitudinal axis, a series of apertures along a path of the column, and a series of bolt fasteners positioned in the series of apertures, the column having a circumference greater than the rebar lap, a head component having a center, an aperture therein through the central portion which the column projects, and legs connected to the head component, tightening the series of bolt fasteners whereby the series of bolt fasteners come in contact with rebar lap securing the rebar lap in a fixed position with respect to the column, extending the legs by engaging a turn style clamp locking mechanism to find support upon the ground.

It is an object of the present invention to provide a surveying support apparatus having: a column having a hollow cylindrical portion, a longitudinal axis, a first end, second end, and a series of apertures along a path of the column, a head component having a center, an aperture therein through the central portion which the column projects, legs connected to the head component, the legs pivotally connected to the head component whereby the legs are movable towards the center of the head component or away from the center of the head component, a series of bolt fasteners positioned in the series of apertures, whereby the series of bolt fasteners are tightened to come in contact with rebar lap protruding from concrete positioned inside of the hollow cylindrical portion of the column, securing the rebar lap in a fixed position with respect to the column, a mounting stand, having a mounting plate and a bracket, the bracket having an aperture therein through the central portion which the column projects, the bracket adapted for rotational motion around the path of the column, a mounting stand, having a mounting plate and a bracket, the bracket having an aperture therein through the central portion which the column projects, the bracket adapted for rotational motion around the path of the column, the mounting plate having an aperture through the mounting plate whereby a mounting screw is positioned, a clamp clamping to the head component whereby the head component is squeezed onto the column by a clamping force to fix the head component relative to the column, the clamp having a release mechanism, whereby when the release mechanism is engaged reduces the clamping force with which the head component is squeezed onto the column whereby the head component is permitted to transitionally move along the longitudinal axis of the column, whereby the legs are extendable by engaging a push button locking mechanism, having sliding mounts for connecting the extending legs to the head component.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
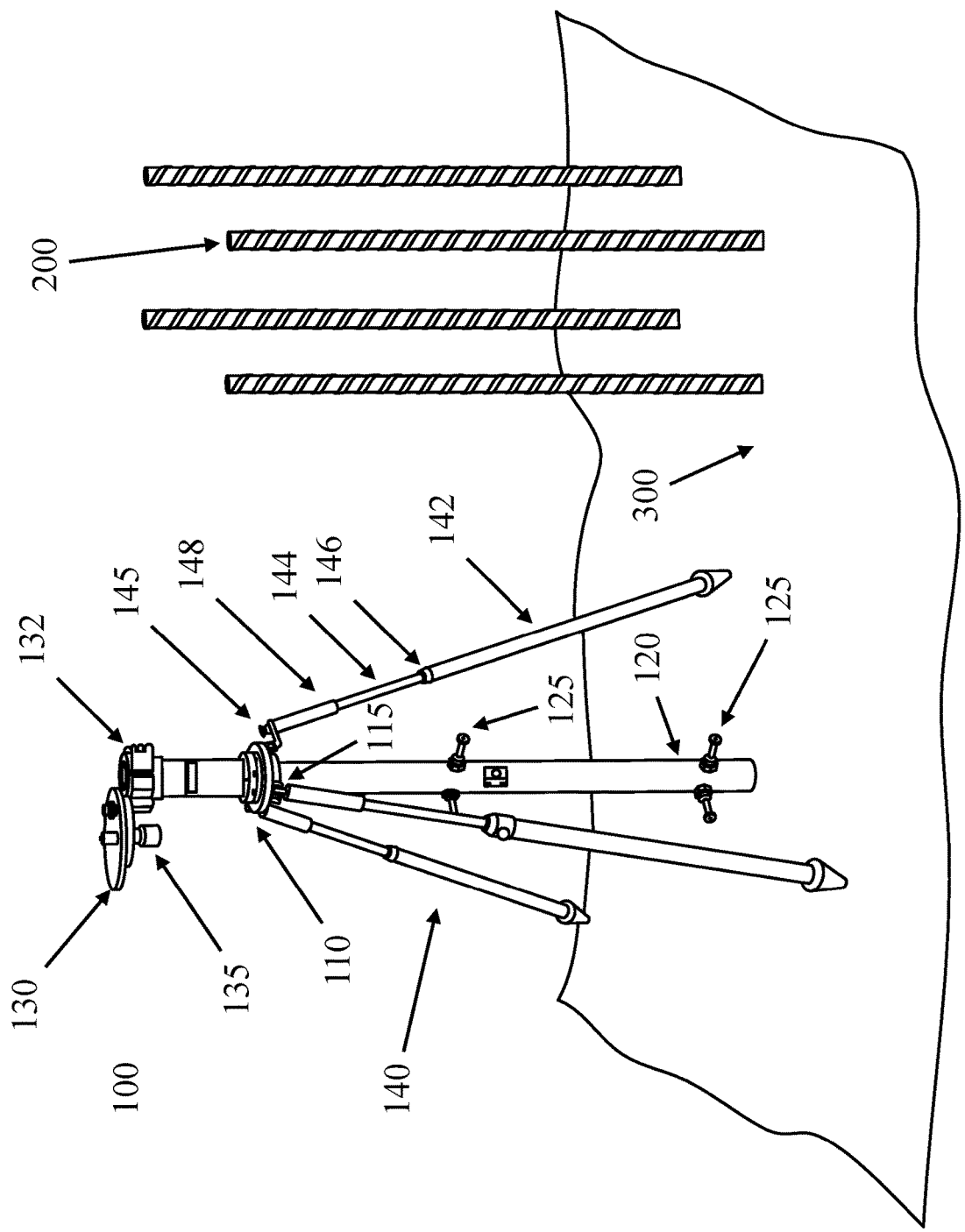
FIG. 1 shows a perspective side view of the surveying support apparatus and rebar lap protruding from concrete.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for a surveying support apparatus that provides greater stability and thus prevents unwanted vibration that can alter calculations extrapolated from survey equipment. Rebar lap is reinforcing steel and reinforcement steel, it is a steel bar or mesh of steel wires used as a tension device in concrete or other structures to strengthen and hold the concrete in compression. Concrete is extremely strong in compression, but is weak in tension. By combining concrete with a material such as rebar that is strong in tension, a composite that can resist tension, moment, shear and compression is formed. At construction sites typically there is protruding rebar lap emerging from structural components to be used later in the extension of concrete structures and frames. The present embodiments describe a surveying support apparatus capable of attaching to one or more pieces of rebar lap to provide further stability to the surveying support apparatus and reliability when taking measurements on survey equipment steadied by the surveying support apparatus.

FIG. 1 depicts one embodiment of surveying support apparatus 100. Surveying support apparatus 100 includes a head component 110, center column 120, mounting plate 130, and legs 140. Head component 110 has generally horizontal top wall of circular configuration and is provided with a plurality of outwardly facing channel shaped members each receiving and pivotally connected to a hinge member, such as hinge member 115, by a pin or other fastener. Hinge members 115 are connected to the upper end of and to their respective leg 140. In some non-limiting embodiments, hinge members 115 may be one or more slidable mounts that allow for legs 140 to be attached in a fixed position and detached to head component 110. The slidable mounts lock by utilizing opposing clamps in conjunction with fasteners to releasably lock and unlock legs 140. Hinge members 115 are preferably mounted to head component 110 in such a manner that legs 140 may be spread out to a specific angle whereby one leg may be positioned at a different angle irrespective of the other legs. In some non-limiting embodiments, hinge members 115 may be designed so that the legs may only spread out to a specific angle.

Legs 140 may be adapted to be situated at a substantially parallel position to help in transporting surveying support apparatus 100 and a spread position to provide support to surveying support apparatus 100 when calculating measurements using a survey instrument device. The spreading of legs 140 allows surveying support apparatus 100 to be used at different heights and to accommodate for uneven surfaces where one or more of legs 140 cannot be at the same height or angle as the other legs 140. In some non-limiting embodiments, the upper ends of legs 140 are directly connected to head component 110. Hinge members 115 may have one or more leg locks designed to hold legs 140 at a desired angle. The leg locks may be sliders that unlock and lock the leg angle at a specific angle, but also may be pull out tabs, friction knobs, spring-loaded mechanisms or any other locks known by those of ordinary skill in the art.

Figure 2:
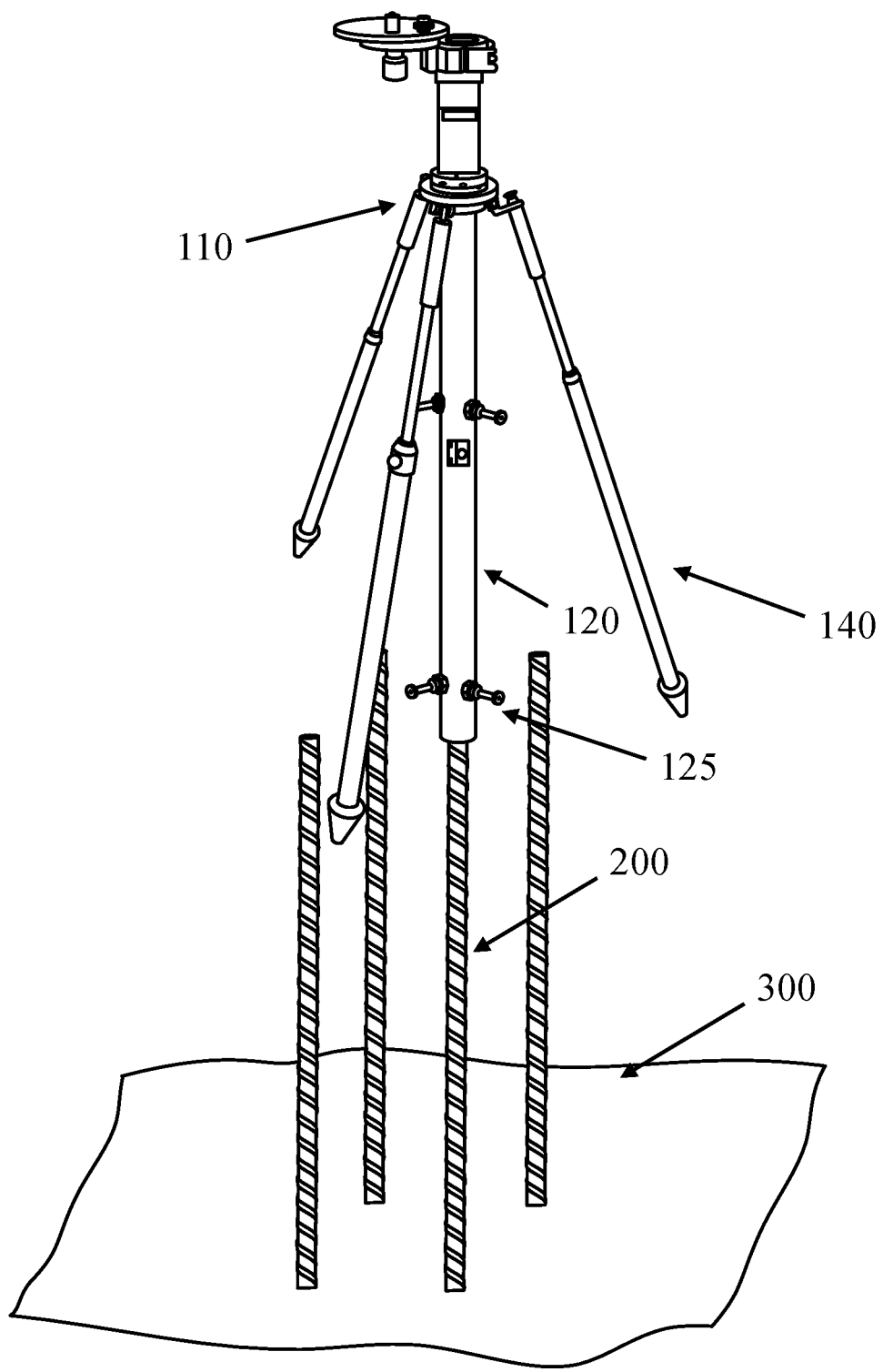
FIG. 2 shows a perspective side view of the surveying support apparatus fitting over the rebar lap protruding from concrete.

Center column 120 includes an elongated tubular member having a hollow vertically disposed cylindrical housing with a longitudinal axis. Center column 120 may be made of heavy duty PVC piping, in one or more non-limiting embodiments, but may alternatively be made of any suitable material including steel, carbon fiber, aluminum, plastics, or other composites. The cylindrical housing is of a height and diameter to accommodate and be fitted over a standard sized vertically aligned protruding rebar lap such as rebar lap 200 protruding from concrete such as concrete 300 as depicted in FIG. 2. Rebar lap is typically a height of 20 inches to 36 inches and a diameter between 0.35 inches to 2.5 inches. These dimensions are non-limiting and the cylindrical housing of center column 120 may be of various heights and dimensions depending on the specific circumstances, workplace, and operation. In further embodiments, center column 120 may be of a different shape including a prism, cube, pyramid, or cone.

Head component 110 is suitably attached to the outer circumference of the center column 120. Head component 110 may have a clamp or pressurized lock whereby the clamp is arranged so that when in the clamped position at least one part of the clamp is clamped to head component 110 whereby head component 110 is squeezed onto center column 120 to fix head component 110 relative to center column 120. The clamp may include a release mechanism, which when engaged partially or fully reduces the force with which head component 110 is squeezed onto center column 120 whereby head component 110 may transitionally move along the longitudinal axis of center column 120 when adjusted by the user.

Figure 3:
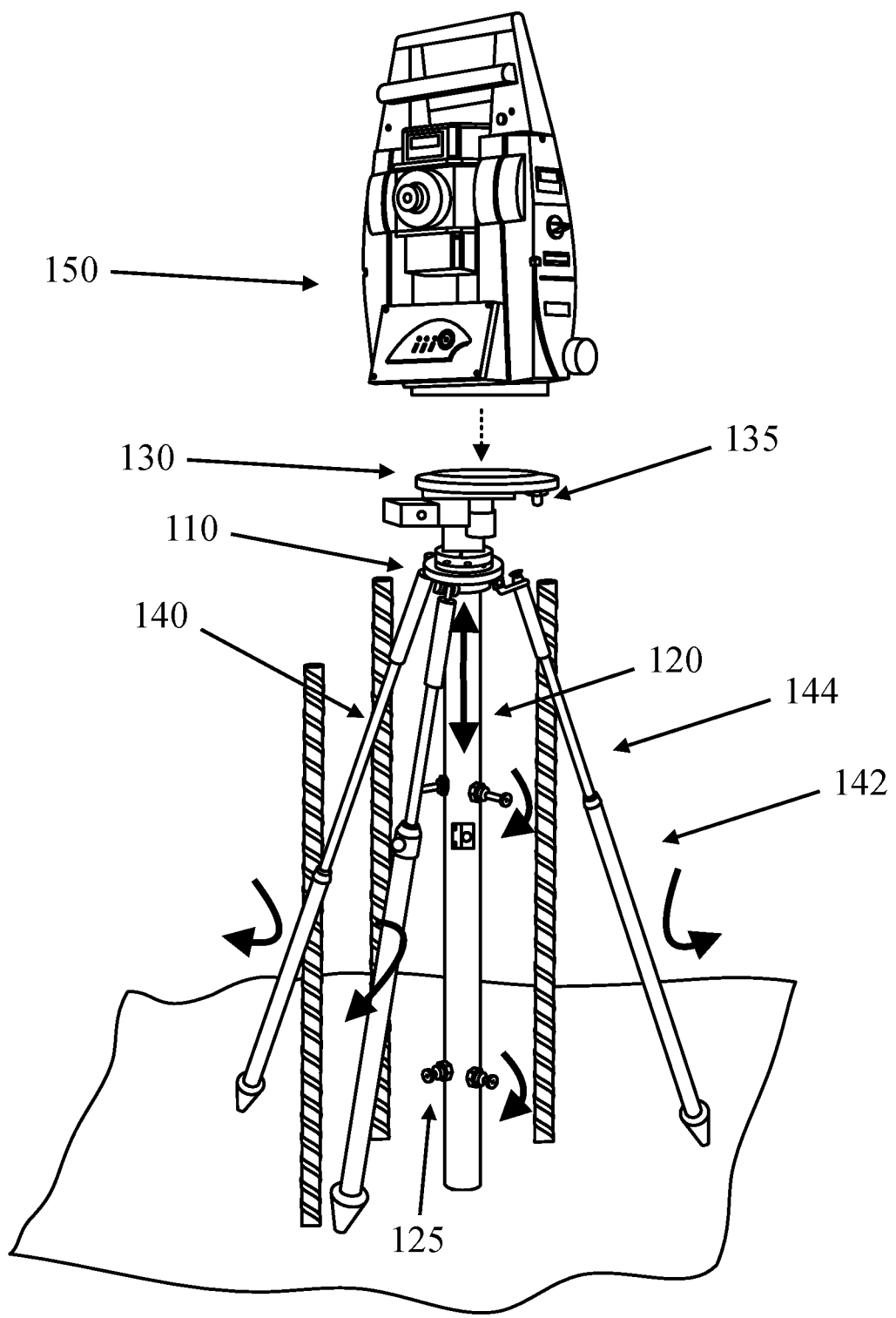
FIG. 3 shows a perspective side view of the surveying support apparatus where the survey instrument device being mounted, the bolt through fasteners tightened, and the head component and legs being positioned to find support on the ground.

In order to retain a specific rebar lap 200 protruding from concrete 300 in position with respect to center column 120, center column 120 includes one or more sets of gripping bodies positioned at spaced intervals around an annular path of the center column. The gripping bodies may be in the form of bolt through fasteners such as bolt through fasteners 125, which are threaded into apertures around the annular path around center column 120. The apertures allow one end of bolt through fasteners 125 to be tightened by twisting bolt through fasteners 125 while the other end is moved into contact with the surface of rebar lap 200 as depicted in FIG. 3. When bolt through fasteners 125 have been set in position in contact with rebar lap 200, the position of rebar lap 200 and center column 120 are fixed with respect to one another. Bolt through fasteners 125 may be loosened by twisting bolt through fasteners 125 in the opposite direction thus moving bolt through fasteners 125 away from the surface of rebar lap 200 whereby center column 120 may then be lifted away from and removed from a specific rebar lap 200.

In some embodiments, at the free end of bolts through fasteners 125 may be structures that have a wider surface area, recesses, or grooves, or shaped in a specific way, to further assist in securing rebar lap 200 to center column 120 when coming into contact with rebar lap 200.

Legs 140 may be extendable to accommodate for varying uneven landscapes and also so surveying support apparatus 100 can stand in a stable manner on an uneven ground. Legs 140 may include an outer tube member such as outer tube member 142 (e.g. as shown in FIG. 3) and an inner tube member such as inner tube member 144 (e.g. as shown in FIG. 3) with a portion protruding from outer tube member 142 and a portion retractably sleeved inside of outer tube member 142. Legs 140 may include a push button mechanism such as push button mechanism 145 (e.g. as shown in FIG. 1) and release block whereby the release block is attached between the outer surface of inner tube member 144 and inner surface of outer tube member 142 to prevent movement of inner tube member 144 relative to outer tube member 142. By depressing the push button 145, the release block is disengaged from the inner surface of outer tube member 142 permitting inner tube member 144 to move in a telescopic motion relative to outer tube member 142. When the desired position of inner tube member 144 relative to outer tube member 142 is achieved, the push button 145 may be released, whereby inner tube member 144 is once again locked in place with respect to outer tube member 142.

In some embodiments, legs 140 may have a built in turn style clamp whereby a clamp is squeezed onto outer tube member 142 to fix inner tube member 144 relative to outer tube member 142 and may be twisted to loosen the clamp and twisted in the opposite direction to tighten the clamp. When the clamp is loosened, the inner tube member 144 may telescopically extend relative to the outer tube member 142 and when the clamp is tightened the inner tube member 144 is fixed in a position relative to the outer tube member.

To prevent the inner tube member 144 from retracting too far into outer tube member 142 or too far out of outer tube member 142, a block (not shown) may be provided at a location around inner tube member 144 and a block may be provided on the inner surface of outer tube member 142 whereby the telescopic motion of the inner tube member 144 may be limited when the blocks interact with one another.

A washer or other sealing apparatus such as washer 146 may be fitted at the open end of the outer tube member 142 and around inner tube member 144 to provide a seal at the juncture between the portion of inner tube member 144 protruding from outer tube member 142 and the outer tube member 142. The base of legs 140 may comprise an additional gripping surface material or any adhesive wherein the material prevents slippage between the base of the legs and the ground. The coverage area of the material may be an externally applied adhesive coating or the material may be impregnated within the base of legs 140. The base itself may optionally have a rough or textured surface so as to increase friction and adherence to the ground without the need for additional layers or adhesives.

In one non-limiting embodiment, legs 140 may have a grip made of a foam material covering a portion of the inner tube or outer tube such as grip 148 to enhance the comfort thereof when grasped by a user and to provide for easier gripping in different environments including during extreme hot or cold weather as well as when raining. In further embodiments, one or more fasteners may be projecting from legs 140 such as fastener 160 whereby the fastener 160 may fasten additional pieces of rebar lap 200 protruding from concrete 300 to provide further stability. The fasteners may be any type of fastener known by those of ordinary skill in the art including clamps, snaps, latches, or hinges.

Mounting plate 130 is connected to center column 120 by a clamp element such as clamp element 132 that is suitably attached to the outer circumference of center column 120. Mounting plate 130 is made of aluminum offset but may be composed of any suitable material such steel, iron, bronze, copper, plastics, or other composites. Mounting plate 130 is provided at the center with a tapered hole, which receives a mounting screw such as mounting screw 135 that extends through the tapered hole and is provided with an enlarged head on one side to facilitate tightening and loosening of mounting screw 130. Survey instrument devices such as survey instrument devices 150, having a recess such as a internally screw threaded insert sleeve may be secured to mounting plate 130 by mounting screw 135 being pushed up under survey instrument device 150 to engage survey instrument device 150 as depicted in FIG. 3. Mounting screw 135 may be screwed tight when survey instrument device 150 is in the correct position.

In one non-limiting, method of use, the user handles surveying support apparatus 100 and positions center column 120 over the vertical rebar lap 200 protruding from concrete 300 and then twists the first set of bolt through fasteners 125 further into the apertures along the annular path of center column 120 until bolt through fasteners 125 come into contact with rebar lap 200. The user then twists second set of bolt through fasteners 125 through the apertures along the annular path of center column 120 until bolt through fasteners 125 come into contact with rebar lap 200. Bolt through fasteners 125 may further be twisted until rebar lap 200 is secured in place with respect to center column 120. The user then engages the release locking mechanism (not shown) between head component 110 and center column 120 to lower the clamping force between head component 110 and center column 120 whereby transitional movement of head component 110 along the longitudinal axis of center column 120 is permitted. The user then disengages the release locking mechanism when the desired height that provides the most stability for accurate calculations is selected, thus securing head component 110 in place with respect to center column 120.

Figure 4:
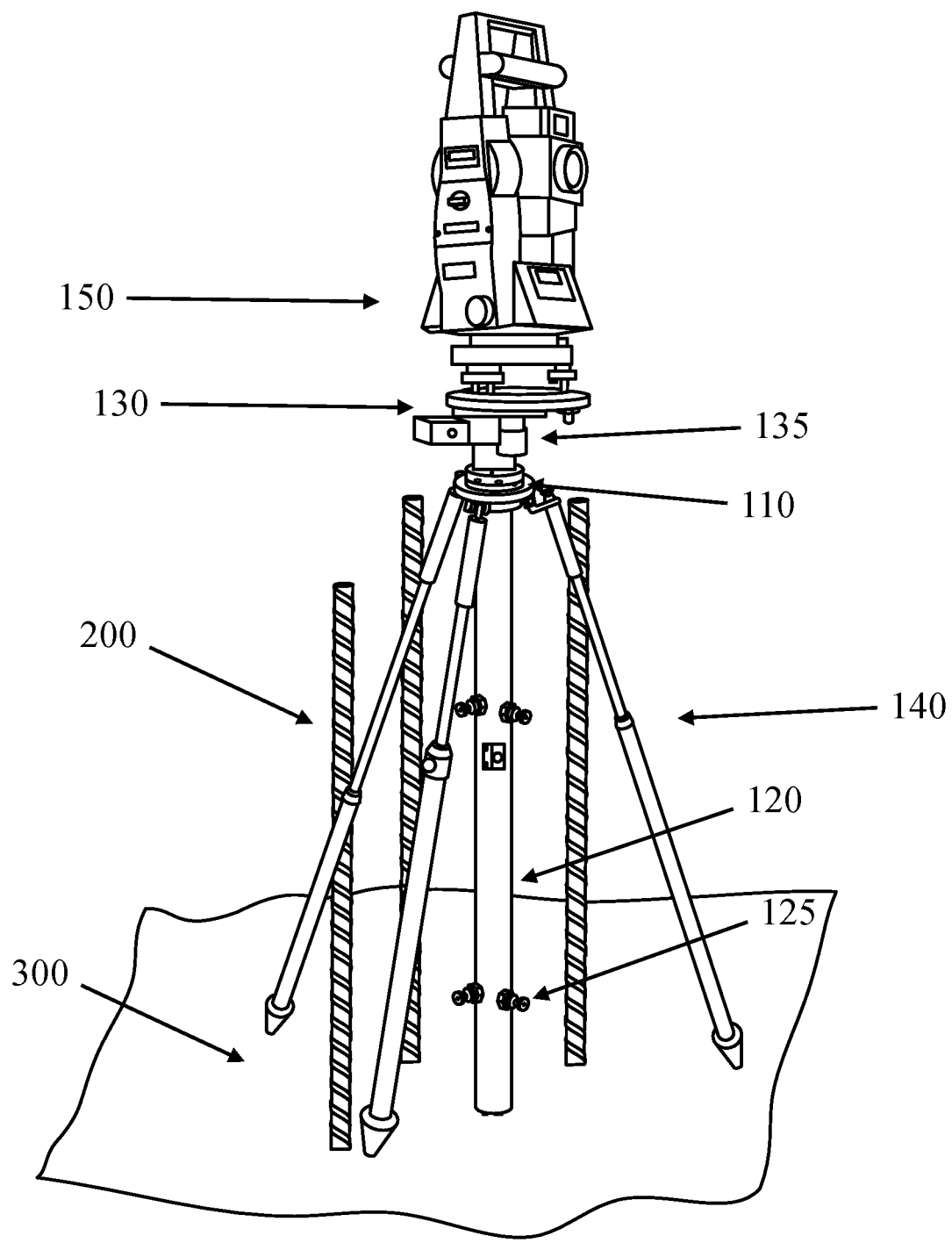
FIG. 4 shows a perspective side view of the surveying support apparatus in the completed assembly.
Figure 5:
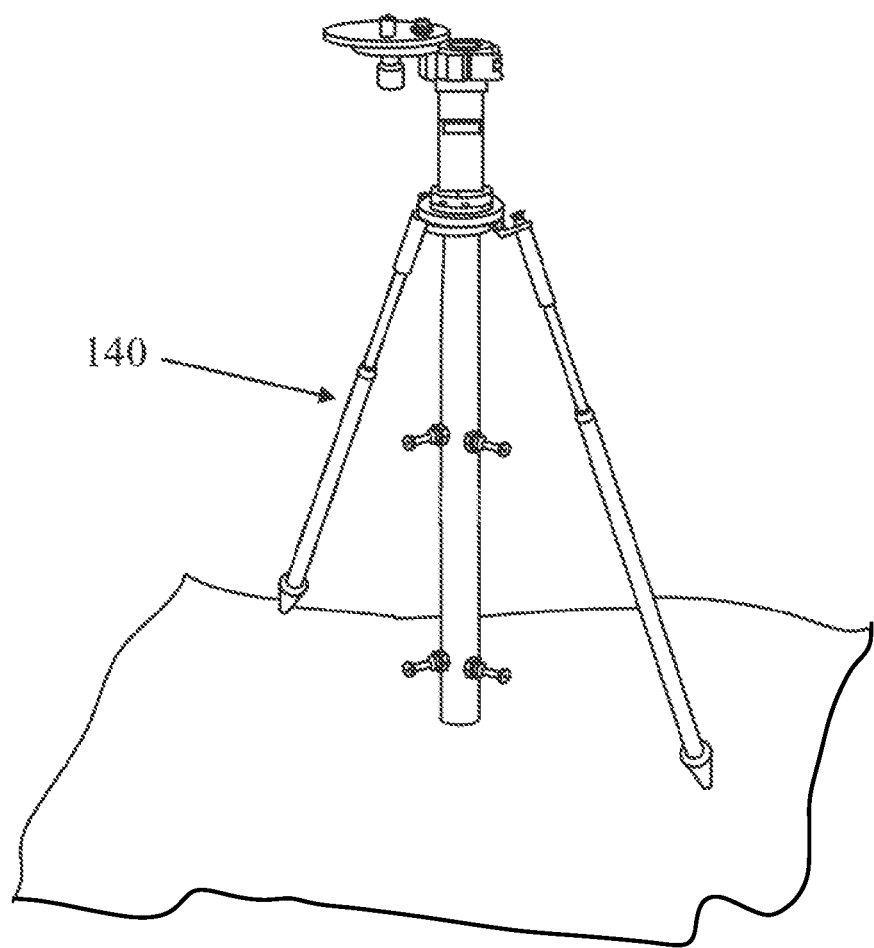
FIG. 5 shows an alternative embodiment of the surveying support apparatus with two support legs.

The user then spreads legs 140, extending or contracting legs 140 using push button mechanism 145 (or alternatively a turn style clamping mechanism) until the height of surveying support apparatus 100 will be suitable to provide the necessary calculations from survey equipment device 150. Once center column 120 and legs 140 are secure, survey equipment device 150 is placed on mounting plate 130. Survey equipment device 150 is then secured by screwing mounting screw 135 into the recess of survey equipment device 150. Survey equipment device 150 may then be used for examination and review in the completed assembly as seen in FIG. 4.

In alternate embodiments, the surveying support apparatus 100 may have two support legs instead of three whereby the two legs are symmetrical along the longitudinal axis of the center column. This number however is non-limiting and the surveying support apparatus may have any number of support legs that provide a sufficient base to utilize survey equipment devices.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

What is claimed is:

1. A surveying support apparatus, comprising:
    a column having a hollow portion, a longitudinal axis, and a series of apertures along a path of the column;
    a number of legs;
    a series of bolt fasteners positioned in the series of apertures, wherein the series of bolt fasteners are configured to be tightened to secure a rebar lap in a fixed position inside the column; and
    a mounting stand, having a mounting plate and a bracket, the bracket having an aperture therein through a center of the bracket which the column projects.

2. The surveying support apparatus of claim 1, further comprising a second series of apertures along a path of the column at a higher position than the first series of apertures and a second series of bolt fasteners positioned in the second series of apertures, wherein the second series of bolt fasteners are configured to be tightened to secure the rebar lap in a fixed position inside the column.

3. The surveying support apparatus of claim 1, further comprising a head component having a center, the head component connecting to the legs, the head component having an aperture therein through the center which the column projects.

4. The surveying support apparatus of claim 1, the mounting plate further comprising an aperture through the mounting plate wherein a mounting screw is positioned.

5. The surveying support apparatus of claim 4, further comprising a surveying equipment device having a recess wherein the surveying equipment device is securable to the mounting plate by the fastening of the mounting screw into the recess.

6. The surveying support apparatus of claim 5, the survey equipment device being a Robotic Total Stations (RTS), 3D scanner, or theodolite.

7. The surveying support apparatus of claim 3, further comprising a sliding mount for connecting the legs to the head component.

8. The surveying support apparatus of claim 1, wherein the legs are extendable by engaging a locking mechanism.

9. A method of stabilizing a surveying support, the method comprising:
    positioning the surveying support over rebar lap protruding from concrete, the surveying support including a column having a hollow portion, a longitudinal axis, a series of apertures along a path of the column, and a series of bolt fasteners positioned in the apertures, a head component having a center, an aperture therein through the center which the column projects, and a number of legs connecting to the head component;
    tightening the bolt fasteners wherein the bolt fasteners come in contact with rebar lap securing the rebar lap in a fixed position with respect to the column; and
    extending the legs to find support upon the ground.

10. A surveying support apparatus, comprising:
    a column having a hollow portion, a longitudinal axis, a first end, second end, and a series of apertures along a path of the column;
    a number of legs;
    a head component having a center, an aperture therein through the center which the column projects, the legs pivotally connected to the head component wherein the legs are movable towards the center of the head component or away from the center of the head component; and
    a series of bolt fasteners positioned in the series of apertures, wherein the series of bolt fasteners are configured to be tightened to secure a rebar lap in a fixed position inside the column.

11. The surveying support apparatus of claim 10, further comprising a second series of apertures along a path of the column at a higher position than the first series of apertures and a second series of bolt fasteners positioned in the second series of apertures, wherein the second series of bolt fasteners are configured to be tightened to secure the rebar lap in a fixed position inside the column.

12. The surveying support apparatus of claim 11, further comprising a mounting stand, having a mounting plate and a bracket, the bracket having an aperture therein through a center which the column projects.

13. The surveying support apparatus of claim 12, the mounting plate further comprising an aperture through the mounting plate wherein a mounting screw is positioned.

14. The surveying support apparatus of claim 13, further comprising a surveying equipment device having a recess wherein the surveying equipment device is securable to the mounting plate by the fastening of the mounting screw into the recess.

15. The surveying support apparatus of claim 10, further comprising a pressurized lock clamping to the head component wherein the head component is squeezed onto the column by a clamping force to fix the head component relative to the column, the pressurized lock comprising a release mechanism, wherein when the release mechanism is engaged reduces a force with which the head component is squeezed onto the column wherein the head component is permitted to transitionally move along the longitudinal axis of the column.

16. The surveying support apparatus of claim 10, wherein the legs are extendable by engaging a locking mechanism.

17. The surveying support apparatus of claim 10, further comprising sliding mounts for connecting the extending legs to the head component.

18. The surveying support apparatus of claim 10, wherein the column is made of PVC.

* * * * *